Sept. 26, 1950  A. F. FAIRBANKS  2,523,503
PRECISION SPEED CONTROL
Filed April 26, 1949  2 Sheets-Sheet 2

INVENTOR.
AVARD F. FAIRBANKS
BY William P. Lane
ATTORNEY

Patented Sept. 26, 1950

2,523,503

UNITED STATES PATENT OFFICE 2,523,503

PRECISION SPEED CONTROL

Avard F. Fairbanks, Los Angeles, Calif., assignc to North American Aviation, Inc.

Application April 26, 1949, Serial No. 89,688

6 Claims. (Cl. 318—8)

This invention pertains to adjustment of speed of a shaft rotation. It particularly pertains to obtaining a shaft rotation of highly constant speed which speed is capable of precision adjustment over pre-determined limits.

It is an object of this invention to provide means for rotating a shaft at a highly constant speed while providing for precise adjustment of the speed.

It is another object of this invention to provide means for adjusting the speed of a shaft driven by a synchronous motor.

It is a further object of this invention to provide a crystal controlled synchronous motor with remote adjustable speed.

It is still a further object of this invention to provide a crystal controlled synchronous motor with a speed remotely adjustable by radio or other communication device.

Other objects of invention will become apparent from the following description taken in connection with the accompanying drawings in which.

Figure 1:
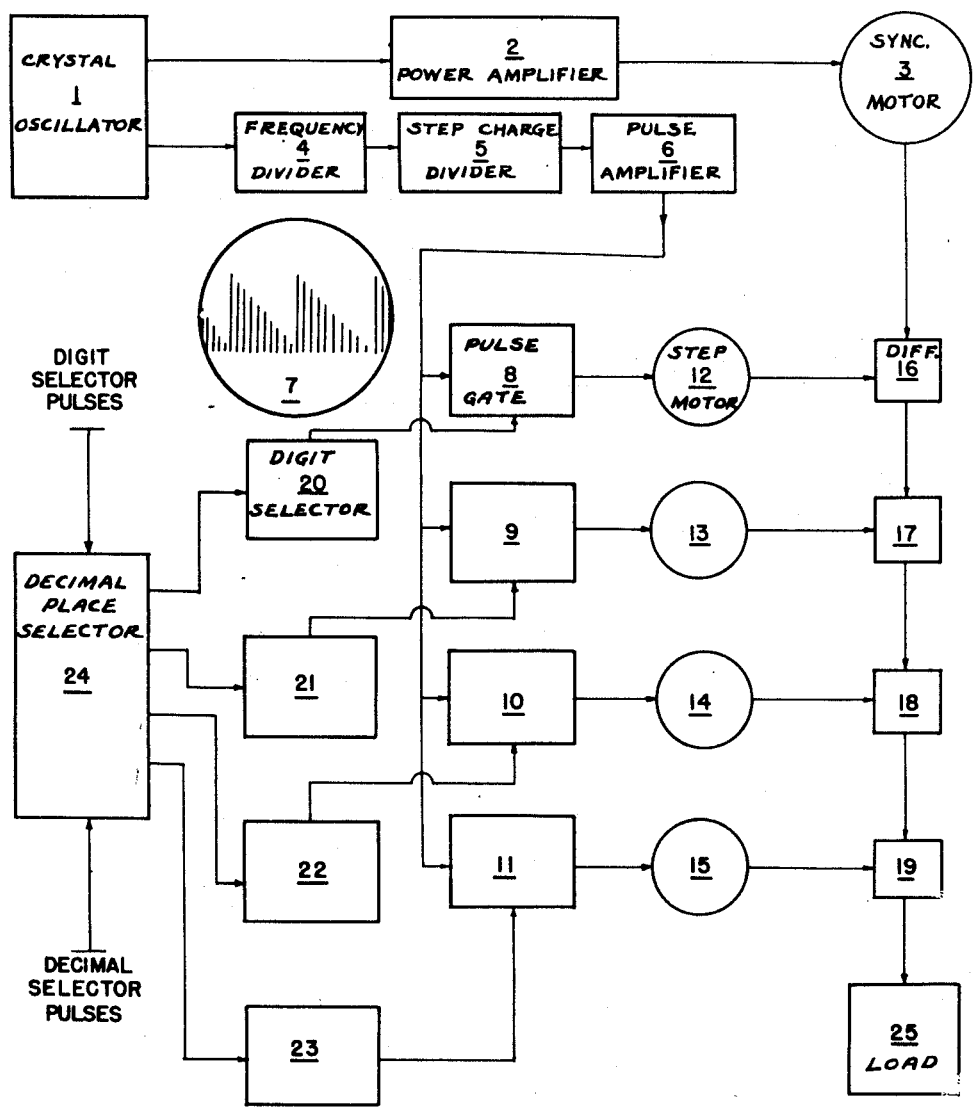
Fig. 1 is a block diagram of the invention.

Referring to Fig. 1, a crystal oscillator 1 emits constant frequency pulses of frequency $f_1$ to power amplifier 2 which drives synchronous motor 3 at constant speed. A second frequency $f_2$, generated by oscillator 1, is fed via frequency divider 4 to step charge divider 5 and pulse amplifier 6 whose output is a repeated series of 10 stepped pulses as shown at 7 in Fig. 1. This series of pulses is fed in parallel to pulse gates 8, 9, 10 and 11 which drive step motors 12, 13, 14 and 15 which are mechanically connected to differentials 16, 17, 18 and 19. Differential 16 has a gear ratio of 1:1 while differentials 17, 18, and 19 have gear ratios of 1:10, 1:100, and 1:1000 respectively. Synchronous motor 3 is shaft connected to differentials 16, 17, 18 and 19 and load 25 so that load 25 is driven at the synchronous speed of motor 3 plus the speed of step motors 12, 13, 14 and 15 as reduced by the gear ratios of differentials 16, 17, 18 and 19. Pulse gates 8, 9, 10 and 11 are controlled by digit selectors 20, 21, 22 and 23 which in turn are controlled by decimal place selector 24 which receives control signals by radio.

Figure 2:
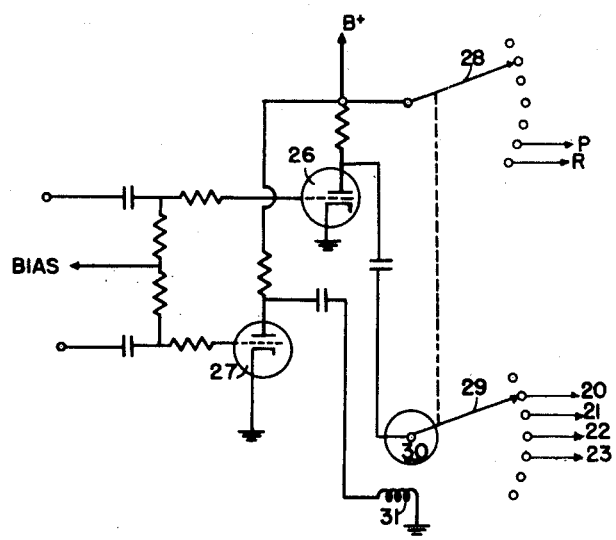
Fig. 2 is a detailed schematic of the decimal place selector of the invention.

Referring now to Fig. 2, there is shown a detailed schematic of decimal place selector 24.

Vacuum tubes 26 and 27 which may also be thyratrons, receive radio transmitted pulses and in turn control rotary switches 28 and 29 which are connected to operate together. Switch 29 is turned by step motor 30 which takes a step in angular movement every time inductance 31 receives a pulse from tube 27.

Figure 3:
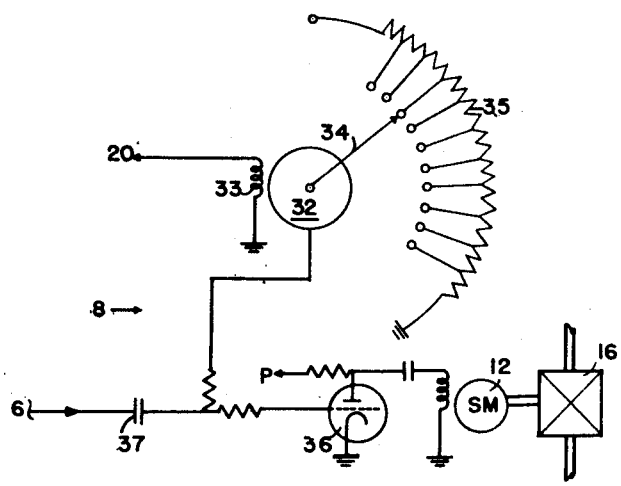
Fig. 3 is a detailed schematic of a typical digit selector, pulse gate, and step motor of the invention.

Digit selectors 20, 21, 22 and 23 are illustrated typically in Fig. 3 where step motor 32 is driven by pulses from tube 26 through switch 29 in Fig. 2 by means of inductance 33. Motion of step motor 32 causes switch 34 to move to successive positions on tapped resistance 35 with ten taps. Such movement causes change in the grid bias of tube 36, resistance 35 being connected to a source of negative voltage such as —100 volts as an example. Pulses from pulse amplifier 6 are fed to the grid of tube 36 via condenser 37 and the pulse output of tube 36 drives step motor 12 which in turn supplies a mechanical rotation to differential 16.

As an example of the operation of the invention let it be required that load 25 be driven with a speed of 10.5432 revolutions per second with speed remotely adjustable between 10.0000 revolutions per second and 11.0000 revolutions per second. The frequency $f_1$ is then chosen so that synchronous motor 3 is driven at 10 revolutions per second. Since motor 3 is connected to load 25 by differentials 16, 17, 18 and 19, load 25 is driven at 10 R. P. S. plus whatever rotations are supplied by said differentials. Differential 16, having a gear ratio of 1:1 is capable of supplying rotations of 0 to 1 revolution per second in multiples of .1 revolution per second. Similarly differentials 17, 18, and 19 supply hundredths, thousandths, and ten-thousandths of a revolution per second.

To set into the device the precise angular velocity desired, continuing as an example the requirements for a load speed of 10.5432 revolutions per second, a decimal selection pulse is supplied to the grid of tube 27 which brings switch 29 to position 20. Then five digit selector pulses are supplied to tube 26 which in turn are supplied to step motor 32 which takes five steps leaving switch 34 on the fifth tap of resistance 35, thus supplying a predetermined grid bias to tube 36.

At this point it must be recalled that condenser 37 is supplying pulses from pulse amplifier 6 which are stepped in form. For the purpose of illustration, they might be furnished as a series of ten stepped pulses graduated from 0 to 100 volts in steps of 10 volts and furnished at the rate of 10 steps or one complete series of pulses every second. But the bias on tube 36 is adjusted, as hereinbefore described, so that only 5 of each series of pulses are allowed to affect the flow of electrons in tube 36. The effect of varying the grid bias of tube 36 therefore is to "clip" off a predetermined number of the pulses in each group of ten coming from pulse amplifier 6. Therefore, to continue the above example, only five pulses are emitted by tube 36 per second so step motor 12 is stepped forward five times per second. Assuming that step motor 12 is devised to rotate one full revolution per ten steps, the angular velocity contributed to driving load 25 by the motion of step motor 12 is .5 R. P. S. The rotation of synchronous motor 3 together with the rotation of step motor 12 supply a rotation of 10.5 R. P. S. to differential 17.

In a similar manner, decimal selector 21 is then moved successively to switch positions 21, 22 and 23 and the biases on pulse gates 9, 10 and 11 are set so as to allow 4, 3 and 2 pulses respectively of each group of ten from pulse amplifier 6 to pass to step motors 13, 14 and 15 respectively. Then, differentials 17, 18 and 19, having reduced gear ratios, supply the 100ths, 1000ths, and 10,000ths of a R. P. S. rotations to load 25 making the final velocity of load 25 the required 10.5432 R. P. S.

After the apparatus is thus set up for the required rotational velocity, step motor 30 is pulsed again disengaging switch 29 from switch position 23 and bringing switch 28 to position P which then supplies plate current to the pulse gates. The device is then ready for operation at the adjusted speed. If it is desired to change the speed setting, an additional pulse is fed to step motor 30 which brings switch 28 to position R to thus energize a reset device (not shown) which returns all switches to initial position after which a new speed may be set into the device in the manner previously stated.

By use of different gear ratios in differentials 16, 17, 18 and 19 and by use of a greater or smaller number of digit selectors, pulse gates, and differentials a speed with any predetermined range of precision adjustment may be obtained by this invention. Furthermore, since the synchronous motor is driven by the amplified output of a crystal controlled oscillator whose frequency has been divided many times, the angular velocity obtained is highly exact.

Although the invention has been described and illustrated in detail, it is to be clearly understood that the same is by way of illustration and example only and is not to be taken by way of limitation, the spirit and scope of this invention being limited only by terms of the appended claims.

I claim:

1. Means for rotating a load at an adjustable constant speed comprising means for producing a constant speed shaft rotation, a plurality of mechanical differentials arranged in series between said constant speed means and said load, means for producing groups of energy pulses at a predetermined rate, adjustable means for selecting a predetermined number of pulses from each of said groups, and means for driving said differentials at a speed which is a function of the number of said selected pulses thereby to rotate said load at an adjustable constant speed.

2. A device as recited in claim 1 in which said means for driving comprise step motors capable of a fraction of a revolution per selected pulse, in which said means for producing groups of energy pulses comprises a step charge divider, and in which said means for selecting pulses is a biased electronic valve which transmits all pulses having amplitude above the value of the bias.

3. Means for rotating a load at an adjustable constant speed comprising means for producing energy pulses at constant frequency, means for producing grouped energy pulses at constant frequency, adjustable means for selecting predetermined numbers of pulses from each of said groups of pulses and means for producing a rotation proportional to the sum of said constant frequency pulses and said selected pulses per unit time.

4. Means for rotating a load at an adjustable constant speed comprising means for producing energy pulses at constant frequency, means for producing grouped energy pulses at constant frequency, adjustable means for selecting predetermined numbers of pulses from each of said groups of pulses, a synchronous motor adapted to be driven by said constant frequency pulses, a plurality of differentials connecting said motor to said load in series and means for driving said differentials at speeds proportional to the frequency of said selected pulses to thereby drive said load at the speed of said synchronous motor plus a speed which is a predetermined function of the speeds of said differential driving means.

5. Means for producing an adjustable constant speed shaft rotation comprising a synchronous motor, crystal controlled means for driving said synchronous motor at constant speed, means for producing a repetitive series of pulses of electrical energy at a frequency of which the frequency of said crystal controlled means is a common denominator and at an amplitude which varies in steps which are multiples of a predetermined amplitude, a plurality of differentials drivingly connected in series between said synchronous motor and the shaft whose speed must be constant but adjustable, a plurality of step motors for driving said differentials, electronic valve means for transmitting said stepped pulses to said step motors, and remotely controllable means for adjusting the bias on said electronic valve means to allow to pass a predetermined number of said stepped pulses in each repetitive series, whereby the shaft speed attained is caused to depend on the sum of the speeds of said synchronous motor and said step motors.

6. Means for rotating a load at a remotely adjustable constant speed comprising means for producing a constant speed shaft rotation, a plurality of mechanical differentials arranged in series between said constant speed means and said load, means for producing groups of electrical pulses at a predetermined rate, remotely controllable adjustable means for selecting a predetermined number of pulses from each of said groups, and means for driving said differentials at a speed proportional to the number of said selected pulses to thereby rotate said load at a constant remotely adjustable speed.

AVARD F. FAIRBANKS.

REFERENCES CITED

The following references are of record in the file of this patent:

UNITED STATES PATENTS

| Number | Name | Date |
| --- | --- | --- |
| 2,300,424 | Jones | Nov. 3, 1942 |
| 2,346,877 | Trofimov | Apr. 18, 1944 |
| 2,433,194 | Bedford et al. | Dec. 23, 1947 |